United States Patent [19]

Fletcher et al.

[11] 4,028,939

[45] June 14, 1977

[54] SYSTEM FOR MEASURING THREE FLUCTUATING VELOCITY COMPONENTS IN A TURBULENTLY FLOWING FLUID

[76] Inventors: James C. Fletcher, Administrator of the National Aeronautics and Space Administration, with respect to an invention of Dah Yu Cheng, Palo Alto, Calif.

[22] Filed: Mar. 15, 1976

[21] Appl. No.: 667,010

[52] U.S. Cl. .................................. 73/189; 73/228
[51] Int. Cl.² ........................................ G01P 5/02
[58] Field of Search ........... 73/189, 194 RE, 194 B, 73/228, 147

[56] References Cited

UNITED STATES PATENTS

| 3,217,536 | 11/1965 | Motsinger et al. | 73/189 |
| 3,552,204 | 1/1971 | Tourmen | 73/189 |
| 3,695,103 | 10/1972 | Olson | 73/189 |
| 3,696,673 | 10/1972 | Ribner | 73/194 |

OTHER PUBLICATIONS

Gessner, "A Method of Measuring Reynolds Stress with Const. Current, Hot–Wire Anemometer" in ASME Publication 64–WA/FE34 Dec. 1964 copy in 73/204 pp.1–3.

Primary Examiner—Herbert Goldstein
Attorney, Agent, or Firm—Darrell G. Brekke; John R. Manning

[57] ABSTRACT

A system for measuring fluid velocity in a turbulently flowing fluid including a sensing apparatus for dynamically sensing the mainstream and two orthogonal cross velocity components of the fluid and a transducer operative to provide three electrical output signals representative of the velocity components in the mainstream and in the cross directions. Signal processors can be utilized to derive the Reynolds stress wave and the Reynolds stress.

10 Claims, 5 Drawing Figures

Fig_1

Fig_2

SYSTEM FOR MEASURING THREE FLUCTUATING VELOCITY COMPONENTS IN A TURBULENTLY FLOWING FLUID

The invention described herein was made in the performance of work under a NASA contract and is subject to the provisions of Section 305 of the National Aeronautics and Space Act of 1958, Public Law 85-568 (72 Stat. 435, 42 U.S.C. 2457 ).

BACKGROUND OF THE INVENTION

1. Field of the Invention

The present invention relates generally to a system for measuring turbulence in fluid flow and more particularly to such a system that measures three orthogonal fluctuating components of velocity in a fluid that is turbulent.

2. Description of the Prior Art

There are two fundamentally different types of flow — laminar and turbulent. Turbulent flow is much more common in nature and in engineering devices than laminar flow. For example, the flow in rivers and the motion of the air in the atmosphere are practically always turbulent. The fluid motions with which the engineer is concerned are turbulent in most cases. In turbulent motion the velocity and pressure at a fixed point do not remain constant with time but perform irregular fluctuations of high frequency. In describing a turbulent flow in mathematical terms, it is convenient to separate it into a mean motion and a fluctuating or eddying motion. In turbulent flow the fluctuations influence the mean motion in such a manner that the latter exhibits an apparent increase in the resistance to deformation. Stated another way, the presence of fluctuations manifests itself in an apparent increase in the viscosity of the fundamental flow.

The flow adjacent to the surface of a body moving in a fluid is called the boundary layer. The flow in this layer may be laminar at low Reynolds numbers (Reynolds number =

$$R = \frac{\text{inertia force}}{\text{viscous force}} )$$

and may become turbulent when the Reynolds number exceeds a certain critical value. This change has a favorable consequence because the violent intermingling of particles enables the turbulent layer to stick to the surface better than does the laminar layer, which contains less kinetic energy and leaves the surface earlier. At low Reynolds numbers, expecially in the range where the drag coefficient of a sphere or cylinder is almost constant and has the larger value, the boundary layer is laminar and the early separation of the flow creates a broad wake filled by vortices. Then, at a certain higher Reynolds number, the flow in the boundary layer becomes turbulent, the separation is delayed, and the size of the wake is reduced.

In many fields, and especially in the field of aeronautics, it is important to be able to measure the transfer of momentum flux due to turbulent fluctuations. In aircraft design, the Navier-Stokes equations are available tools which may be employed to solve for the drag and lift characteristics of a given airfoil in turbulent flow. These equations cannot be solved unless the time-averaged momentum fluxes associated with turbulent flow are known.

Prior to my earlier invention, described in U.S. Pat. No. 3,964,306, June 26, 1976, no apparatus was known which could measure in real time instantaneous momentum flux (Reynolds stress wave) and time-averaged momentum flux (Reynolds stress). My invention provided a sensor which dynamically sensed fluctuating velociy components of the fluid in the mainstream direction and in a direction normal thereto. However, the apparatus does not provide a means for separating the cross velocity components into orthogonal components and hence is only operable to measure momentum flux in two directions.

At present, the standard instrument for measuring air velocity is the hot-wire anemometer. The hot-wire anemometer is a resistive flow-velocity transducer which consists essentially of a thin heated wire supported at its ends so that it loses heat to the air stream which is being measured. This convective heat loss varies approximately with the square root of fluid velocity. Two operating modes are used for the hot-wire anemometer. In both modes the wire is heated by the current flowing through it. When the wire is operated at constant current, its resistance increases with cooling and the resulting bridge unbalance produces an output voltage which can be related to fluid velocity. Faster response time is obtained by operating the transducer in a constant temperature mode. Sometimes two hot-wire anemometers are oriented in a cross configuration to obtain "directional" information. This arrangement will only work if the flow is planar (in the plane of the two wires). Obviously, any turbulence transverse or oblique to the plane of the wires will cause cooling of the wires and will generate errors. The wire in a hot-wire anemometer cannot discern whether air flows are approaching from the side, top, bottom, or any other direction.

In addition to the above disadvantage, the hot-wire anemometer is unsatisfactory because it is influenced by parameters of the fluid that is to be measured (density, temperature, chemical composition).

Another prior art device is based on the principle of measuring the doppler shifts of light scattered from small suspended particles in the flowing stream. However, the data obtained from these measurements is that of a spectrum of mainstream and cross velocities of a particular particle as a function of time and, accordingly, the data must be tediously correlated to be useful. Moreover, this technique is further dependent upon the density fluctuation of the fluid.

In yet another device for measuring the flow unsteadiness in a turbulent fluid flow, a device comprising a lift-sensor element having a lift-sensing surface has been developed. This device senses flow velocity disturbances perpendicular to a mainstream fluid flow and develops a time varying lift force with corresponding displacement responsive to time variation of the velocity disturbances. thus, this probe is limited in that it detects only the perturbed velocity vectors in other than the mainstream direction and thus cannot be used to provide measurements of drag forces in the fluid. In addition, the probe is sensitive to the positioning of the lift-sensor and hence, its indications are dependent upon the rate of change of the angle of attack of the fluid.

Examples of prior art fluid velocity and/or direction sensing instruments are found in U.S. Pat. No. 3,696,673, "Method and Means of Measuring Velocity Fluctuations in Unsteady Flow," Ribner et al; U.S. Pat. No. 3,217,536, "Force Vector Transducer," Motsinger et al; U.S. Pat. No. 3,552,204, "Means for Detecting and Recording Water Wave Direction," Tourmen; U.S. Pat. No. 2,985,014, "Anemometer," Doersam, Jr.; U.S. Pat. No. 3,264,869, "Process and Apparatus for Studying Currents," Erdely; and U.S. Pat. No. 3,695,103, "Current and Turbulence Meter," Olson. None of these patents reveal instruments capable of measuring the transfer of momentum flux resulting from turbulent flow.

SUMMARY OF THE PRESENT INVENTION

It is therefore a primary object of the present invention to provide an improved system for directly measuring fluctuating velocity components in three directions in a turbulently flowing fluid.

Still another object of the present invention is to accomplish the previously stated object by providing spherical sensing means for dynamically sensing velocity components of the fluid in the mainstream and in two orthogonal directions and to provide electrical output signals representative of the velocity components, Reynolds stress wave and Reynolds stress.

Briefly, the preferred embodiment includes a spherically-shaped probe which moves in accordance with the drag forces acting thereon for disposition in the flowing fluid to sense the velocity components of the fluid in the mainstream and in two orthogonal cross directions. The probe is fastened to one end of an elongated member and a magnetic armature is attached to the opposite end. The elongated member is centrally supported in such a manner that it has three degrees of freedom — one degree axially along the mainstream and two degrees in a plane normal thereto. The magnetic armature is disposed near several pole pieces so as to provide three magnetic circuits having gaps between the armature and the pole pieces. Three pairs of coils are associated with the magnetic circuits and develop electrical signals corresponding to the change in gap length. When the probe, elongated member and armature are moved, the gap length in the magnetic circuits is changed. This causes the coils to generate a first electrical signal representative of the time derivative of the member displacement in the mainstream direction and second and third electrical signals representative of the member displacement in orthogonal directions lying in a plane transverse to the mainstream direction. Signal processing means responsive to the electrical signals provide respective outputs indicative of the fluid velocity components in the mainstream direction, and in two orthogonal directions which lie in a plane transverse to the mainstream directon. Additional circuit means, including a product generator, provides signals representative of the Reynolds stress wave and the Reynolds stress.

An important advantage of this invention is that measurements of instantaneous velocity fluctuations in three directions are provided on a real time base.

These and other objects and advantages of the present invention will no doubt become apparent to those of ordinary skill in the art after having read the following detailed description of the preferred embodiment which is illustrated in the several figures of the drawing.

IN THE DRAWING

FIG. 1 is a schematic diagram of a system for measuring fluid velocity in accordance with the present invention;

FIG. 2 is a longitudinal cross sectional view of the drag sensing apparatus in accordance with the present invention;

DETAILED DESCRIPTION OF THE PREFERRED EMBODIMENT

In order to diagnose turbulent flow characteristics, it is highly desirable to have a device that will measure the transfer of momentum flux as well as instantaneous velocity. Once the time-averaged momentum flux (Reynolds stress) is known, an aircraft designer, for example, can employ the information to calculate the drag and lift characteristics of a proposed wing design, a fuselage design, etc.

FIG. 1 depicts a system for producing first, second and third signals representative of three instantaneous orthogonal velocities. A sensor 10 with a spherical probe 12 and a magnetoelectric transducer 14 is placed in the turbulent flow exhausted by jet engine 16. Probe 12 is free to work in three orthogonal directions, one along the mainstream and two transverse to the mainstream direction. Hereinafter, with reference to the conventional Cartesian coordinate system illustrated, the axis parallel to the mainstream direction will be referred to as the $x$ axis, and the orthogonal axes normal to the mainstream direction will be referred to as the $y$ axis and the $z$ axis.

The velocity vector of the flow will be referred to as $\hat{V}$, and the instantaneous fluctuation quantities of the velocity vector along the $x$, $y$, and $z$ axes will be referred to as $u$, $v$, and $w$, respectively.

$$\hat{V} = \hat{i}(U + u) + \hat{j}v + \hat{k}w$$

wherein $U$ = the mean velocity along the $x$ axis, and $\hat{i}, \hat{j}, \hat{k}$ = the unit vectors in the $x$, $y$, and $z$ directions, respectively.

Sensor 10 senses the time variations of drag of sphere 12 along the $x$, $y$ and $z$ axes. First, second and third signals which are functions of the orthogonal drag forces are generated by the transducer 14 and fed into processing circuits 18, 20 and 22, respectively. The first transducer signal, a function of the $x$-axis drag forces, is amplified in amplifier 24 and differentiated in differentiator 26. The second transducer signal, a function of the $y$-axis drag forces, is amplified in amplifier 28 and differentiated in differentiator 30. The third transducer signal, a function of the $z$-axis drag forces, is amplified in amplifier 32 and differentiated in differentiator 34. The outputs of differentiators 26, 30, and 34 are representative of instantaneous velocities, $u$, $v$, and $w$, respectively, and they are displayed on multitrace oscilloscope 36.

Figures 3, 4:
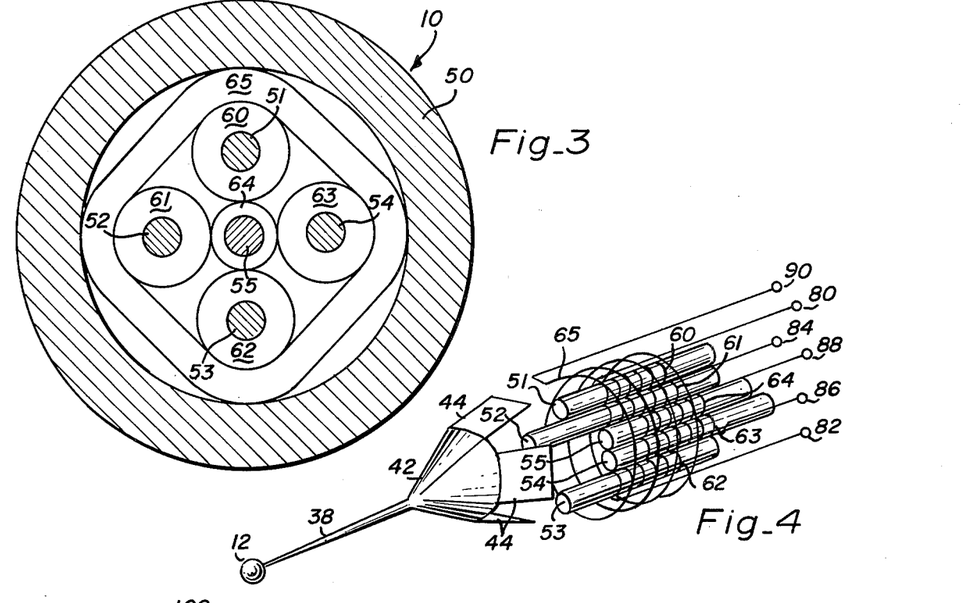
FIG. 3 is a cross sectional view taken through the lines 3—3 on FIG. 2.
FIG. 4 is an exploded view diagrammatically illustrating the operation of the present invention.

Turning now to FIGS. 2 and 3, the sensor 10 is shown in cross section views. The sensor 10 comprises the probe 12, the transducer 14 and a support member 38.

The probe 12 is a spherically-shaped body and serves to sense drag components along the $x$, $y$ and $z$ axes. To quicken the response of the sensor 10 to variations in the instantaneous fluid flow, the sphere is fabricated from balsa wood so as to reduce its mass. The sphere surface is preferably smooth.

$$C_D = \frac{F_D}{\frac{1}{2} \rho V^2 A}$$

which can also be written as $$F_D = C_D A \frac{\rho}{2} (\vec{V} \cdot \vec{V})$$

wherein $C_D$ = coefficient of drag
$F_D$ = drag
$\rho$ = density of the fluid
$\vec{V}$ = free stream velocity vector of fluid
$A$ = frontal area of a body exposed to flow direction ½
$\rho V^2$ = dynamic head
The Reynolds number of a sphere is $$R = \frac{\rho V d}{\mu} = \frac{\text{inertia force}}{\text{friction force}}$$

wherein
$d$ = the diameter of the sphere
$\mu$ = viscosity
The drag force about a sphere is largely due to pressure defects from flow separation. The separation angle of a laminar flow about a sphere increases with Reynolds number but the separation angle becomes substantially constant from a Reynolds number of $2 \times 10^3$ to $2 \times 10^5$. The angle suddenly decreases to a small value when R is larger than $2 \times 10^5$. From the previous drag equation it is apparent that when the coefficient of drag $C_D$ is constant, the drag force $F_D$ is directly proportional to the dynamic head ($\frac{1}{2} \rho V^2$). Thus, where density is constant, the drag is a function of the fluid velocity only. Also, where density varies, the velocity and density variations can be deduced from the measured fluctuating quantities of the velocity vector as will be described subsequently in more detail.

As the Reynolds number of a sphere is directly proportional to the velocity of the fluid in which it is immersed, probes used in high velocity fluids must be smaller than probes used in low velocity fluids. In one embodiment of the invention used for measuring the exhaust of a jet engine, the sphere diameter was 0.130 inches.

The rigid thin elongated support member 38 depends from the spherical probe 12 and is secured thereto with a force fit. Member 38 has an enlarged center portion 40 and a permeable magnetic material 42 affixed to its distal end by epoxy. In the preferred embodiment, the member 38 is a cylindrical aluminum rod. The magnetic material 42 has a generally pyramid-like shape with four flared and tapered flaps 44 as shown in FIG. 4, is comprised of soft sheet iron, and serves as a magnetic armature. A visco-elastomeric collar 46 preferably formed from a silicon rubber material is molded around member 38 and covers the center portion 40 and a portion of the magnetic material 42. The collar 46 is surrounded by and cemented to the inside faces of a magnetic shield support 48 which may particularly be formed from a soft iron material. The shield 48 has a shape that resembles a truncated cone and receives the distal end of the member 38 therewithin such that the member 38 is supported by the shield and pivotal about the rubber collar in the y and z directions and axially movable along the x direction. The shield 48 also serves to prevent external magnetic fields from linking the magnetic material 42.

Accordingly, when the sensor is positioned in a turbulently flowing fluid, the spherically-shaped probe 12 causes a drag, or resistance, to the fluid flow. When the fluid strikes the smooth surface of probe 12, it causes the probe to move in the resultant direction of fluid flow whereby the member 38 pivots about the rubber collar 46, is axially displaced and causes a corresponding displacement of the magnetic material 42. The circular fit of the rubber collar within the shield allows the member to have two degrees of freedom and its resiliency, when subjected to an axial force, allows the member to have a third degree of freedom.

The transducer 14 comprises a permanent magnet 50, magnetic pole pieces 51-55, a front pole tip assembly 56, rear pole piece 57, and coils 60-65. The pole pieces 51, 52, 53, and 54 are elongated rod-shaped members extending parallel to each other with their respective center lines lying on a circle in transverse cross section (see FIG. 3). The pole piece 55 is also a rod-shaped member having its center line lying on the center line in the above-described circle and having a longitudinal dimension which is less than that of the pole pieces 51-54. In the preferred embodiment, the members have a diameter of 0.050 inches and are formed from soft iron.

Coils 60-64 are wound around the respective pole pieces 51-55 and serve to develop an electrical signal in response to a charge in magnetic flux passing through the corresponding pole piece. The electric connections between the coils will be subsequently described in more detail.

A front support 66 and rear support 67 serve to maintain the pole pieces 51-55 in parallel alignment. The supports 66 and 67 each have a disk-like shape with aligned openings for receiving the pole pieces and are formed from a non-magnetic material such as teflon or polyethylene. The front pole tip assembly 56 comprises four elongated magnetic members (only two of which are shown in FIG. 2), each having an outer surface that includes a rear portion 58 that abuts the front portion of the respective pole pieces 51-54 so as to be in magnetic contact therewith and a front portion 59 that is tapered downwardly to form a knife edge facing the magnetic material 42.

In the preferred embodiment, each front portion 59 is tapered at an angle of about 10° relative to the rear portion 58 so that the respective outer surface or pole faces are substantially parallel to the inner surface of the respective flap 44, and separated therefrom by a generally constant gap length 70 when the probe is in the neutral position. The gaps 70 provide a region of high intensity magnetic fields which are in a direction normal to the pole faces between the flaps 44 and the front portions 59.

A non-magnetic spacer 72 is disposed against the front surface of the support 66 and the center pole piece 55 extends laterally to the inner surface of the magnetic shield support 48, and secures the rear portion 58 of the front pole tip assembly 56 against the respective pole pieces 51-54. The spacer 72 serves to maintain the center pole piece 55 out of magnetic contact with the pole tip assembly 56 and the pole pieces 51-54 out of magnetic contact with the shield 48. In the preferred embodiment, the spacer 72 is formed from lucite material, has a generally truncated conical shape and in cross section has four rectangular openings therethrough to receive the respective members of the pole tip assembly 56.

A generally annular permanent magnet 50 is disposed around the magnetic pole pieces 51–55 between the magnetic shield 48 and the rear pole piece 57 and in an abutting relationship with the periphery of the front and rear supports 66 and 67. The magnet 50 is made from a strong magnetic material such as the ceramic, barium ferrite, and is axially magnetized in the elongated direction of the pole pieces 51–55. The rear pole piece 57 is generally cylindrical in shape and is juxtaposed against the rear surface of the permanent magnet 50 and the center pole piece 55 and has openings for receiving the pole pieces 51–54 in an abutting relationship. The coil 65 is wound around the periphery of the entire pole piece structure comprising the pole pieces 51–55 as shown in FIG. 3 and has an axis that coincides with the axis of coil 64.

It will be realized by those skilled in the art that the permanent magnet 50 provides a magnetic flux generating means which generates a continuous magnetic flux of constant magnitude through three magnetic circuits. The first magnetic circuit comprises the rear pole piece 57, the pole piece 51 and its corresponding front pole tip member 56, the air gap 70, the corresponding flap 44 of the magnetic material 42, the opposed air gap 70 and corresponding flap 44 and pole tip member 56, and the pole piece 53. The second circuit is comprised of similar elements with the pole pieces 52 and 54 replacing the pole pieces 51 and 53. The third magnetic circuit comprises the rear pole piece 57, the central pole piece 55, all the outer pole pieces 51, 52, 53 and 54 and their corresponding pole tips and air gaps, the four flaps 44 and the shield 48.

Referring also to FIG. 4, a diagrammatic view of the magnetic circuits and electrical connections of the coils are illustrated. For purposes of clarity, the pole tip assembly and the rear pole piece are not shown. As illustrated one terminal of the coil 60 is connected to one terminal of the coil 62 in such a manner as to couple the coils together in a magnetic differential configuration. Hence, the voltage appearing across the output terminals 80 and 82 of the two coils is due to the flux change through the cores 51 and 53. Similarly, one terminal of the coil 61 is connected to one terminal of the coil 63 so that the voltage appearing across the output terminals 84 and 86 of the coils 61 and 63 is due to the flux change through the cores 52 and 54. In addition, one terminal of the inner coil 64 is connected to one terminal of the outer coil 65. Hence, the total flux linking the outer coil 65 and appearing at the output terminals 88 and 90 is indicative of the total flux changes within the cores 51, 52, 53 and 54, but excluding the flux change in core 55, and within the four air gaps 48.

The operation of the transducer 14 is based on the induced field "moving magnetic armature" principle.

As the magnetic armature is displaced from a neutral position by movement of the spherical probe 12, the magnetic coupling in the three magnetic circuits is changed causing a corresponding magnetic field or flux change. The six coils 60–65 are fed the changes in magnetic field gated by the moving armature. The coils 60 and 62 generate a first electrical output signal $e_y$, at te terminals 80 and 82 in response to the displacement of the armature in the cross direction. The coils 61 and 63 generate a second electrical output signal, $e_z$, at the terminals 84 and 86 corresponding to the displacement of the member in the z cross direction. The coils 64 and 65 generate a third electrical signal, $e_x$, at the terminals 88 and 90 in response to the displacement of the armature in the mainstream or x direction. The direction of movement of the armature determines whether the resulting electrical output signal will be produced by the first, second or third channel, the amount of movement determining the amplitude of the signal.

In a preferred embodiment of the sensor 10, the natural frequency is found experimentally to be 340 Hertz. This is typically much less than the frequency range of interest in flow measurements. Accordingly, it should also be recognized that by mechanical analogy the probe has the resonance frequency of a simple mechanical system consisting of a mass, a spring and a damper and that such frequency is much lower than that of the flow measurements. In view of the dynamics of the simple mechanical system and electrodynamic principles, the relationship between the voltages $e_x$, $e_y$, $e_z$, and the measured quantities can be derived from the following equations, considering a viscous fluid flow.

With reference again to FIG. 1 and as previously mentioned, the magnitude of the drag force vector is given by the equation $$F_D = C_D A \frac{\rho}{2} (\hat{V} \cdot \hat{V}).$$

Let the angle between the force vector and the x–y plane be referred to as $\alpha$ and the angle between the force vector and the x–z plane be referred to as $\beta$.

Referring again to FIG. 1, it should be realized that $$|OB| = \{(U+u)^2 + v^2\}^{1/2},$$

$$|AB| = w, \text{ and}$$

$$\alpha = \arctan\left[\frac{w}{\{(U+u)^2 + v^2\}^{1/2}}\right].$$

Similarly,
$$|OC| = \{(U+u)^2 + w^2\}^{1/2},$$

$$|AC| = v, \text{ and}$$

$$\beta = \arctan\left[\frac{v}{\{(U+u)^2 + w^2\}^{1/2}}\right].$$

Consequently, wherein the angle between OB and OD in the xy plane is referred to as $\gamma$ and between OC and OD is referred to as $\delta$, $$\gamma = \arctan\left(\frac{v}{U+u}\right), \text{ and}$$

$$\delta = \arctan\left(\frac{w}{U+u}\right).$$

By trigonometry, the component of F in the x direction is given by $$F_x = |F| \cos \alpha \cos \gamma.$$

By substitution, $$F_x = C_D A \frac{\rho}{2} [(U+u)^2 + v^2 + w^2] \cos \alpha \cos \gamma.$$

Similarly, $$F_y = |F|\cos\alpha \sin\gamma$$
$$= C_D A \frac{\rho}{2}[(U+u)^2 + v^2 + w^2]\cos\alpha\sin\gamma,$$

and $$F_z = |F|\cos\beta\sin\delta$$
$$= C_D A \frac{\rho}{2}[(U+u)^2 + v^2 + w^2]\cos\beta\sin\delta.$$

Upon expanding the trigonometric terms in binomial series and neglecting higher order terms for order of magnitude comparison, it can be shown that $$\alpha \simeq \frac{w}{\{(U+u)^2 + v^2\}^{1/2}}$$

$$\beta \simeq \frac{u}{\{(U+u)^2 + w^2\}^{1/2}}$$

$$\gamma \simeq \frac{v}{(U+u)}$$

$$\delta \simeq \frac{w}{(U+u)}$$

and $$\cos\alpha \simeq 1$$
$$\cos\gamma \simeq 1$$
$$\sin\gamma \simeq \frac{v}{(U+u)}$$
$$\cos\beta \simeq 1$$
$$\sin\delta \simeq \frac{w}{(U+u)}$$

Upon substitution, the components of the drag F in the three orthogonal directions are given as:

$$F_x ( C_D A \frac{\rho}{2}(U+u)^2$$
$$F_y = C_D A \frac{\rho}{2} Uv$$
$$F_z = C_D A \frac{\rho}{2} Uw$$

When the density fluctuations of the flow are taken into consideration, that is $$\rho = \rho_0 + \rho'$$

wherein
$\rho_0 =$ the average density and
$\rho' =$ the fluctuations in density, only the $x$ component of the drag is affected. Substituting this relationship into the preceding equations, provides $$F_x = C_D \frac{A}{2}(\rho_0 + \rho')(U+u)^2$$

$$= C_D A \frac{\rho_0}{2} U^2 \left\{ 1 + \frac{\rho'}{\rho_0}\left(1 + \frac{u}{U}\right)^2 \right\}$$

Linearizing the terms yields $$F_x = C_D A \frac{\rho_0}{2} U^2 \left[\frac{\rho'}{\rho_0} + 2\frac{u}{U}\right]$$

and $$F_y = C_D A \frac{\rho_0}{2} U^2 \left[\frac{v}{U}\right]$$

$$F_z = C_D A \frac{\rho_0}{2} U^2 \left[\frac{w}{U}\right]$$

and, when density fluctuations are small, the $x$ component of drag can be rewritten as $$F_x = C_D A \frac{\rho_0}{2} U^2 \left[\frac{2u}{U}\right]$$

DYNAMICS OF PROBE RESPONSE

Since the probe is a simple mechanical system in each of three orthogonal directions which comprises a mass, a spring and a damper, the component of the motion in any one direction can be thought of as being one-dimensional.

The equation of motion of such a system is $$m\ddot{q}(t) + c\dot{q}(t) + kq(t) + F(t)$$

wherein
$m =$ the mass
$c =$ the coefficient of damping
$k =$ the spring constant, and
$q =$ the displacement Considering the force F to be a sinusoidally varying quantity, $$F(t) = F_0 \sin(2\pi ft) = Im[F_0 e^{i2\pi ft}]$$

wherein Im [ ] means the imaginary part of [ ]. Assuming the solution of the equation of motion is $$q(t) = Q\sin(2\pi ft - \phi) = Im[e^{i(2\pi ft - \phi)}]$$

its derivatives are $$\dot{q}(t) = Im[iQ\, 2\pi f e^{i(2\pi ft - \phi)}]$$

$$\ddot{q}(t) = Im[Q(2\pi f)^2 \cdot e^{i(2\pi ft - \phi)}]$$

Substituting these equations into the equation of motion provides $$Im[\{k - (2\pi f)^2 m + i2\pi ftc\} Q\, e^{i(2\pi ft - \phi)}] = Im[F_0 e^{i2\pi ft}]$$

Therefore, the particular solution of the equation of motion is $$q(t) = Im\left[\frac{F_0 e^{i2\pi ft}}{k - (2\pi f)^2 m + i2\pi ftc}\right]$$

Let $$\zeta = \frac{c}{2\sqrt{km}}$$

$$fn = \frac{1}{2\pi}\sqrt{\frac{k}{m}}.$$

For a system that is critically damped and has oscillatory damping, the solution becomes $$q(t) = Im\left[\frac{F_0 e^{i2\pi ft}}{k\left\{1 - \left(\frac{f}{fn}\right)^2 + i2\zeta\frac{f}{fn}\right\}}\right]$$

The denominator of such equation can be rewritten in terms of magnitude and phase as $$k\left[1-\left(\frac{f}{fn}\right)^2+2i\zeta\frac{f}{fn}\right]=k\left[\left\{1-\left(\frac{f}{fn}\right)^2\right\}^2+2\zeta\left(\frac{f}{fn}\right)^2\right]^{1/2}\cdot e^{i\phi}$$

where $$\phi = \arctan\left[\frac{2\zeta\frac{f}{fn}}{1-\left(\frac{f}{fn}\right)^2}\right].$$

Therefore, $$q(t) = Im\left[\frac{F_0 e^{i2\pi n} e^{-i\phi}}{k\left[\left\{1-\left(\frac{f}{fn}\right)^2\right\}^2+\left(2\zeta\frac{f}{fn}\right)^2\right]^{1/2}}\right]$$

which can be rewritten in trigonometric terms as $$q(t) = \frac{F_0 \sin(2\pi ft - \phi)}{k\left[\left\{1-\left(\frac{f}{fn}\right)^2\right\}^2+\left(2\zeta\frac{f}{fn}\right)^2\right]^{1/2}}$$

and the phase angle $$\phi = \arctan\left[\frac{2\zeta\frac{f}{fn}}{1-\left(\frac{f}{fn}\right)^2}\right]$$

The electrical signal developed by the probe is proportional to the time rate of change of gap length in the three magnetic circuits. More particularly, $$e = -N\,\mu_0\,\frac{FA}{\delta^2}\,\frac{d\delta}{dt}$$

wherein
$N$ = number of turns in the coils 60–65
$\mu_0$ = magnetic permeability of the air gap 70
$F$ = magnetic potential difference across the air gap 70
$A$ = cross sectional area of the pole face formed by rear portion 58
$\delta$ = dimension of the air gap 70, and
$(d\delta/dt)$ = the time rate of change of the dimension of the air gap 70.

The inductive voltage e is also shown to be proportional to the rate of change of displacement ($q$) produced by the mass of a simple mechanical system with force input.

Therefore, $$e = -N\,\mu_0\,\frac{FA}{\delta^2}\,(\dot{q}).$$

Now, differentiating the equation for displacement provides the rate of change of the displacement, $$\dot{q}(t) = \frac{F_0\,2\pi f\,\cos(2\pi ft - \phi)}{k\left[\left\{1-\left(\frac{f}{fn}\right)^2\right\}^2+\left(2\zeta\frac{f}{fn}\right)^2\right]^{1/2}}$$

The above equation indicates that the rate of change of the displacement depends on the frequency, $f$, of the force of constant amplitude, $F_0$, and the ratio between the force frequency, $f$, and the resonance frequency of the simple mechanical system, $fn$.

Where the frequency of the force is much greater than resonance frequency, i.e., $f \gg fn$, then $$\dot{q}(t) \simeq \frac{(2\pi fn)^2}{2\pi f}\,\frac{F_0}{k}\,\cos(2\pi ft - \phi)$$

Hence, differentiation of the equation for inductive voltage, $e$, provides $$\frac{\partial e}{\partial t} \simeq \ddot{q}(t) \simeq -\frac{F_0}{k}(2\pi fn)^2 \sin(2\pi ft - \phi)$$

This equation is generally independent of the frequency, $f$, of the probe in the frequency region of interest, e.g., $f \gg fn$, and is representative of each of the instantaneous velocity components.

Figure 5:
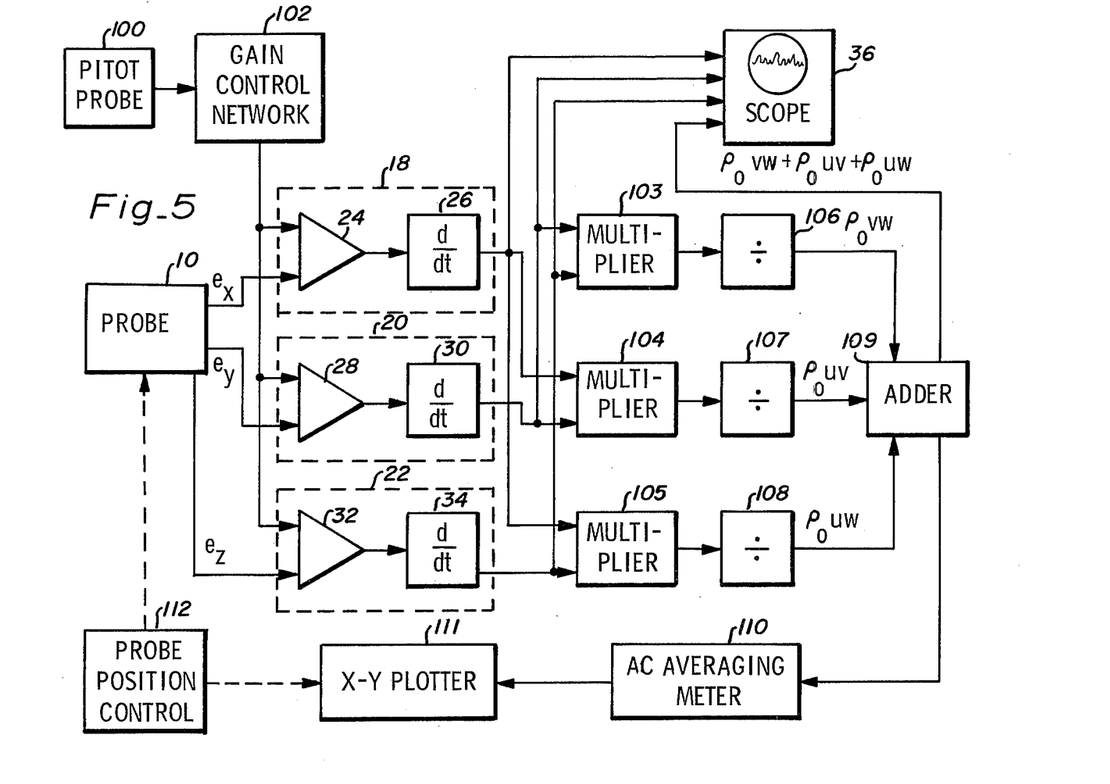
FIG. 5 is a schematic diagram of the system for measuring momentum flux in accordance with the present invention.

Turning now to FIG. 5 of the drawings, a schematic diagram of the momentum flux measuring system of the present invention is illustrated. Electrical signals $e_x$, $e_y$, and $e_z$ are generated by the coils of transducer 14 in response to the three-degree movement of spherical probe 12 in the turbulent flowing fluid. The first electrical output signal $e_x$ is processed in channel 18 which comprises an amplifier 24 and a differentiator 26. Similarly, the second electrical output signal is processed in channel 20, which comprises amplifier 28 and differentiator 30, and the third electrical output signal is processed in channel 22 which comprises amplifier 32 and differentiator 34. A pitot probe 100 is utilized to measure the dynamic head of the fluid and develop a signal proportional to $\frac{1}{2}\rho_0 U^2$. For convenience, the pitot probe may be placed directly downstream from probe 10. Gain control 102 produces a signal representative of the square root of the pitot probe signal. The gain of amplifiers 24, 28 and 32 are altered by the square root operator so that the output of amplifier 24 is proportional to $$\frac{e_x}{\sqrt{\frac{1}{2}\rho_0 U^2}},$$

the output of amplifier 28 is proportional to $$\frac{e_y}{\sqrt{\frac{1}{2}\rho_0 U^2}},$$

and the output of amplifier 32 is proportional to $$\frac{e_z}{\sqrt{\frac{1}{2}\rho_0 U^2}}.$$

One way to fashion an analog square-root generator is to insert a squarer in the feedback loop of an operational amplifier. As a result of the gain control network 102, the signals leaving amplifiers 24, 28 and 32 no longer contain a U factor. Differentiator 26 provides a $(de_x/dt)$ component of $e_x$ which is proportional to u, differentiator 28 provides a $(de_y/dt)$ component of $e_y$, which is proportional to v and differentiator 34 provides a $(de_z/dt)$ component of $e_z$ which is proportional to w. The output signals from differentiators 26, 30 and 34 are displayed on oscilloscope 36 and fed to multiplier networks 103, 104 and 105. The output signals from differentiators 26, 30 and 34 are directly proportional to the instantaneous orthogonal velocities $u$, $v$ and $w$, respectively. The output signal from the differentiators 30 and 34 are applied to the multiplier network 103 which provides a product signal proportional to $\rho_0 vw$; the output signals from differentiators 26 and 30 are applied to multiplier network 104 which provides a product signal proportional to $\rho_0 uv$; and the output signals from differentiators 26 and 34 are applied to multiplier 105 which provides a product signal proportional to $\rho_0 uw$. The product signals are functions of a number of constants times $\rho_0$, $u$, $v$, and $w$. If desired, for ease of calibration or other reasons, dividing networks 106, 107 and 108 may be employed to remove the surplus constants ($C_D$, A, etc.). Dividing networks 106–108 in their simplest form may consist of a potentiometer set to divide by the inverse of the constants. An adding network 109 serves to add the signals $\rho_0 vw + \rho_0 uv + \rho_0 uw$ to provide the Reynolds stress wave or the instantaneous momentum of flux to the oscilloscope 36 and the meter 110. The Reynolds stress wave signal is time averaged in meter 110 to produce a signal proportional to Reynolds stress $\rho_0(\overline{vw} + \overline{uv} + \overline{uw})$. The signals fed into multipliers 103–105 are ac signals; however, the signal leaving the multiplier has an ac component as well as a dc component. Meter 110 takes the average value of the ac input waveform from dividers 106–108, displays it, and sends a signal proportional thereto to x-y plotter 111.

Meter 110 may be, for example, a Hewlett-Packard Model 403B ac voltmeter. The value of the Reynolds stress is permanently recorded by x-y plotter 111. Probe position control 112 simultaneously moves prove 10 along a path while it moves the pen of plotter 111 along the abscissa of the graph.

The flux of momentum per unit time through an area is always equivalent to an equal and opposite force exerted on the area by the surroundings. In one embodiment, the area under consideration is normal to the $x$ axis and the Reynolds stress is a shear stress in the $y$ direction. The Reynolds stress can be interpreted as the transport of the $x$ momentum through a surface normal to the $y$ axis. Although the time average of $u$, $v$, or $w$ is zero, the mean products of the terms are different from zero.

While the invention has been particularly shown and described with reference to certain perferred embodiments, it will be understood by those skilled in the art that various alterations and modifications in form and detail may be made therein. Accordingly, it is intended that the following claims over all such alterations and modifications as fall within the true spirit and scope of the invention.

What is claimed is:

1. A system for measuring Reynolds stress wave in a turbulent fluid comprising:
    an electromagnetic sensor with a probe movable about a mainstream direction $x$ and about two orthogonal transverse directions $y$ and $z$, said sensor having means for generating first, second, and third signals representative of the time varying drag forces on said probe about said $x$, $y$, and $z$ directions, respectively; and
    circuit means for converting said first, second and third signals into a signal proportional to the Reynolds stress wave $\rho_0 vw + \rho_0 uv + \rho_0 uw$ wherein $\rho_0$ is the average density of the fluid, $u$ is the instantaneous velocity of the fluid in the $x$ direction, $v$ is the instantaneous velocity of the fluid in the $y$ direction, and $w$ is the instantaneous velocity of the fluid in the $z$ direction.

2. A system as recited in claim 1 wherein said sensor comprises:
    an elongated member having a first end and a second end;
    a visco-elastomeric collar surrounding and resiliently supporting said elongated member between said first and second ends;
    a spherically-shaped probe fastened to said first end of said elongated member;
    a magnetic armature secured to said second end of said elongated member; and
    first, second and third pairs of coils, said second and third pairs of coils having a pole piece with one end terminating near said armature, said ends being arranged to circumscribe said armature whereby said second and third electric signals are generated in said second and third pairs of coils, respectively, when said probe, elongated member and armature are moved by the turbulent fluid, said first pair of coils including an inner coil disposed centrally relative to said second and third pairs of coils and an outer coil surrounding said second and third pairs of coils, whereby said first electric signal is generated in said first pair of coils when said probe, elongated member and armature are moved by said turbulent fluid.

3. A system for measuring Reynolds stress in a turbulent fluid comprising:
    an electromagnetic sensor with a probe movable about a mainstream direction $x$ and about two orthogonal transverse directions $y$ and $z$, said sensor having means for generating first, second and third signals representative of the time varying drag forces on said probe about said $x$, $y$ and $z$ directions, respectively; and
    circuit means for converting said first, second and third signals into a signal proportional to the Reynolds stress $\rho_0 \overline{uv} + \rho_0 \overline{vw} + \rho_0 \overline{uw}$ wherein $\rho_0$ is the average density of the fluid, $u$ is the instantaneous velocity of the fluid in the $x$ direction, and $v$ is the instantaneous velocity of the fluid in the $y$ direction, and $w$ is the instantaneous velocity of the fluid in the $z$ direction.

4. A system as recited in claim 3 wherein said sensor comprises:
    an elongated member having a first end and a second end;
    a visco-elastomeric collar surrounding and resiliently supporting said elongated member between said first and second ends;
    a spherically-shaped probe fastened to said first end of said elongated member;
    a magnetic armature secured to said second end of said elongated member; and
    first, second and third pairs of coils, said second and third pairs of coils having a pole piece with one end terminating near said armature, said ends being arranged to circumscribe said armature whereby said second and third electric signals are generated in said second and third pairs of coils, respectively, when said probe, elongated member and armature are moved by the turbulent fluid, said first pair of coils including an inner coil disposed centrally relative to said second and third pairs of coils and an outer coil surrounding said second and third pairs of coils, whereby said first electric signal is generated in said first pair of coils when said probe, elongated member and armature are moved by said turbulent fluid.

5. A system for measuring Reynolds stress wave in a turbulent fluid comprising:

a sensor with probe having three degrees of freedom, one degree being in the mainstream direction $x$ and the other two degrees being in the directions $y$ and $z$ which are normal to the mainstream, said sensor including means for generating signals $e_x$, $e_y$ and $e_z$ which are representative of the time varying drag forces on said probe about said $x$, $y$ and $z$ directions, respectively;

means for differentiating said $e_x$ signal so as to produce a fourth signal;

means for differentiating said $e_y$ signal so as to produce a fifth signal;

means for differentiating said $e_z$ signal so as to produce a sixth signal;

means for multiplying said fourth, fifth and sixth signals; and means for adding the multiplied signals and thereby generating a signal proportional to the Reynolds stress wave $\rho_0 vw + \rho_0 uv + \rho_0 uw$ wherein $u$ is the instantaneous velocity of the fluid in the $x$ direction, $v$ is the instantaneous velocity of the fluid in the $y$ direction and $w$ is the instantaneous velocity of the fluid in the $z$ direction.

6. A system as recited in claim 5 wherein said sensor comprises:

an elongated member having a first end and a second end;

a visco-elastomeric collar surrounding and resiliently supporting said elongated member between first and second ends;

a spherically-shaped probe fastened to said first end of said elongated member;

a magnetic armature secured to said second end of said elongated member; and circuit means for converting said first, second and third signals into a signal proportional to the Reynolds stress wave $\rho_0 vw + \rho_0 uv + \rho_0 uw$ wherein $\rho_0$ is the average density of the fluid, $u$ is the instantaneous velocity of the fluid in the $x$ direction, $v$ is the instantaneous velocity of the fluid in the $y$ direction and $w$ is the instantaneous velocity of the fluid in the $z$ direction.

7. A system for measuring Reynolds stress in a turbulent fluid comprising:

a sensor with a probe having three degrees of freedom, one degree being in the mainstream direction $x$ and the other two degrees being in the directions $y$ and $z$ normal to the mainstream, said sensor including means for generating signals $e_x$, $e_y$ and $e_z$ which are representative o the time varying drag forces on said probe about said $x$, $y$ and $z$ directions, respectively;

means for differentiating said $e_x$ signal so as to produce a fourth signal;

means for differentiating said $e_y$ signal so as to produce a fifth signal;

means for differentiating said $e_z$ signal so as to produce a sixth signal;

means responsive to said fourth, fifth and sixth signals and operative to generate a signal proportional to the Reynolds stress wave $\rho_0 vw + \rho_0 uw$, wherein $u$ is the instantaneous velocity of the fluid in the $x$ direction, $v$ is the instantaneous velocity of the fluid in the $y$ direction, and $w$ is the instantaneous velocity of the fluid in the $z$ direction; and means for deriving the ac average value of said Reynolds stress wave signal and thereby producing a signal proportional to the Reynolds stress.

8. A system as recited in claim 7 wherein said sensor comprises:

an elongated member having a first end and a second end;

a visco-elastomeric collar surrounding and resiliently supporting said elongated member between said first and second ends;

a spherically-shaped probe fastened to said first end of said elongated member;

a magnetic armature secured to said second end of said elongated member; and circuit means for converting said first, second and third signals into a signal proportional to the Reynolds stress wave $\rho_0 vw + \rho_0 uv + \rho_0 uw$ wherein $\rho_0$ is the average density of the fluid, $u$ is the instantaneous velocity of the fluid in the $x$ direction, $v$ is the instantaneous velocity of the fluid in the $y$ direction, and $w$ is the instantaneous velocity of the fluid in the $z$ direction.

9. A system for measuring instantaneous velocity components in a fluid with turbulent fluctuations comprising:

a sensor with a probe that is capable of moving in the mainstream direction $x$ and in two directions $y$ and $z$ orthogonal to the mainstream direction;

said probe comprising a smooth sphere;

an elongated member depending from said sphere;

means for pivotally supporting said elongated member wherein said member is free to move in said $X$, $y$ and $z$ directions;

transducing means coupled to said elongated member for generating first, second and third electrical signals which are representative of the time varying drag forces on said sphere along said $x$, $y$ and $z$ directions, respectively;

first signal processing means responsive to said first electrical signal operative to differentiate said first signal so as to provide a fourth signal which is proportional to the instantaneous fluid velocity along the $x$ direction;

second signal processing means responsive to said second signal and operative to differentiate said second signal so as to provide a fifth signal which is proportional to the instantaneous fluid velocity along the $y$ direction; and third signal processing means responsive to said third electrical signal and operative to differentiate said third signal so as to provide a sixth signal which is proportional to the instantaneous fluid velocity along the $z$ direction.

10. A system as recited in claim 9 and further comprising means responsive to said fourth, fifth and sixth signals and operative to provide a visual indication of such signals.

* * * * *